(12) United States Patent
Li

(10) Patent No.: US 9,979,833 B2
(45) Date of Patent: May 22, 2018

(54) METHOD FOR CONTROLLING USAGE TIME OF ELECTRONIC DEVICE

(71) Applicant: WISTRON CORP., New Taipei (TW)

(72) Inventor: Rich Li, New Taipei (TW)

(73) Assignee: WISTRON CORP., New Taipei (TW)

( * ) Notice: Subject to any disclaimer, the term of this patent is extended or adjusted under 35 U.S.C. 154(b) by 111 days.

(21) Appl. No.: 14/951,265

(22) Filed: Nov. 24, 2015

(65) Prior Publication Data

US 2017/0034339 A1 Feb. 2, 2017

(30) Foreign Application Priority Data

Jul. 28, 2015 (CN) .......................... 2015 1 0451801

(51) Int. Cl.
*H04M 1/725* (2006.01)
*H04M 15/00* (2006.01)
*H04M 1/67* (2006.01)

(52) U.S. Cl.
CPC ............. *H04M 15/58* (2013.01); *H04M 1/67* (2013.01)

(58) Field of Classification Search
CPC ................................. H04M 15/58; H04M 1/67
See application file for complete search history.

(56) References Cited

U.S. PATENT DOCUMENTS

| | | | | |
|---|---|---|---|---|
| 9,338,308 B1* | 5/2016 | Adams, Jr. | .......... | H04M 15/745 |
| 2003/0186201 A1* | 10/2003 | Martin | ..................... | G09B 5/00 434/236 |
| 2008/0212787 A1* | 9/2008 | Goldstein | .............. | A61B 5/121 381/56 |
| 2013/0006064 A1* | 1/2013 | Reiner | ................. | A61B 5/4884 600/300 |
| 2013/0035608 A1* | 2/2013 | Goldstein | .............. | A61B 5/121 600/559 |
| 2014/0058483 A1* | 2/2014 | Zao | ......................... | A61N 5/06 607/88 |
| 2014/0295911 A1* | 10/2014 | Bychkov | ............. | H04B 1/3838 455/550.1 |
| 2014/0313041 A1* | 10/2014 | Tesanovic | ........... | H04B 1/3838 340/657 |

(Continued)

FOREIGN PATENT DOCUMENTS

| CN | 101566964 A | 10/2009 |
|---|---|---|
| CN | 102833410 A | 12/2012 |

(Continued)

OTHER PUBLICATIONS

TW Office Action dated May 16, 2016 as received in Application No. 104128256 (English Translation).

*Primary Examiner* — Qun Shen
(74) *Attorney, Agent, or Firm* — Maschoff Brennan

(57) ABSTRACT

A using time control method for electronic device includes the following steps. In a monitoring period, obtain a first usage datum of a first event executed by the electronic device, a second usage datum of a second event executed by the electronic device and a third usage datum of the first event and the second event both executed by electronic device. Obtain a detection value according to a first weighting rule, the first usage datum, the second usage datum and the third usage datum. Selectively limit the part of operation functions of the electronic device according to the detection value and the first threshold value.

16 Claims, 3 Drawing Sheets

(56) References Cited

U.S. PATENT DOCUMENTS

2015/0039756 A1* 2/2015 Agarwal .............. H04L 12/141
709/224
2015/0264558 A1* 9/2015 Wigton ................ G06K 9/0061
455/418

FOREIGN PATENT DOCUMENTS

| CN | 103024168 A | 4/2013 |
| CN | 103093335 A | 5/2013 |
| TW | 201123089 A | 7/2011 |
| TW | 201447569 A | 12/2014 |

* cited by examiner

METHOD FOR CONTROLLING USAGE TIME OF ELECTRONIC DEVICE

CROSS-REFERENCE TO RELATED APPLICATIONS

This non-provisional application claims priority under 35 U.S.C. § 119(a) on Patent Application No. 201510451801.4 filed in People Republic of China (P.R.C.) on Jul. 28, 2015, the entire contents of which are hereby incorporated by reference.

BACKGROUND

Technical Field

The present disclosure relates to a method for controlling usage time of an electronic device, particularly to a method for limiting part of the functions of the electronic device when a user overuses the electronic device.

Description of the Related Art

In current society, smart electronic devices with touch screen functions, such as smart phones, laptops, desktop PCs, and other smart electronic devices, are gradually becoming part of modern people's life. As the advancement of modern technology, the power and memory capacity are higher and higher, and the processor is capable of multi-tasking, and speed of the mobile network is faster, and network bandwidth is larger. In addition, the applications on the smart electronic devices are prosperous, so the smart electronic devices are even more convenient.

Because of the versatility and convenience of the smart electronic devices, many people use the devices with a long time and even mentally rely on the devices seriously. Therefore, those people's life and health are affected accordingly.

SUMMARY

A method for controlling usage time of electronic device for an electronic device includes in a monitoring period, obtaining a first usage datum of which the electronic device executes a first event, a second usage datum of which the electronic device executes a second event, and a third usage datum of which the electronic device executes both the first event and the second event, obtaining a detection value according to a first weighting rule, the first usage datum, the second usage datum, and the third usage datum, and selectively limiting part of operation functions of the electronic device according to the detection value and a first threshold value.

The method of the present disclosure obtains the usage condition of which the electronic device executes the single event or the multiple events, and compares the numerical results with the threshold values to selectively limit part of the functions of the electronic device, so that the usage time of the electronic device is controlled and the user is notified to avoid using the electronic device with too much time and affecting life and health.

The contents of the present disclosure set forth and the embodiments hereinafter are for demonstrating and illustrating the spirit and principles of the present disclosure, and for providing further explanation of the claims.

BRIEF DESCRIPTION OF THE DRAWINGS

The present disclosure will become more fully understood from the detailed description given hereinbelow and the accompanying drawings, which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
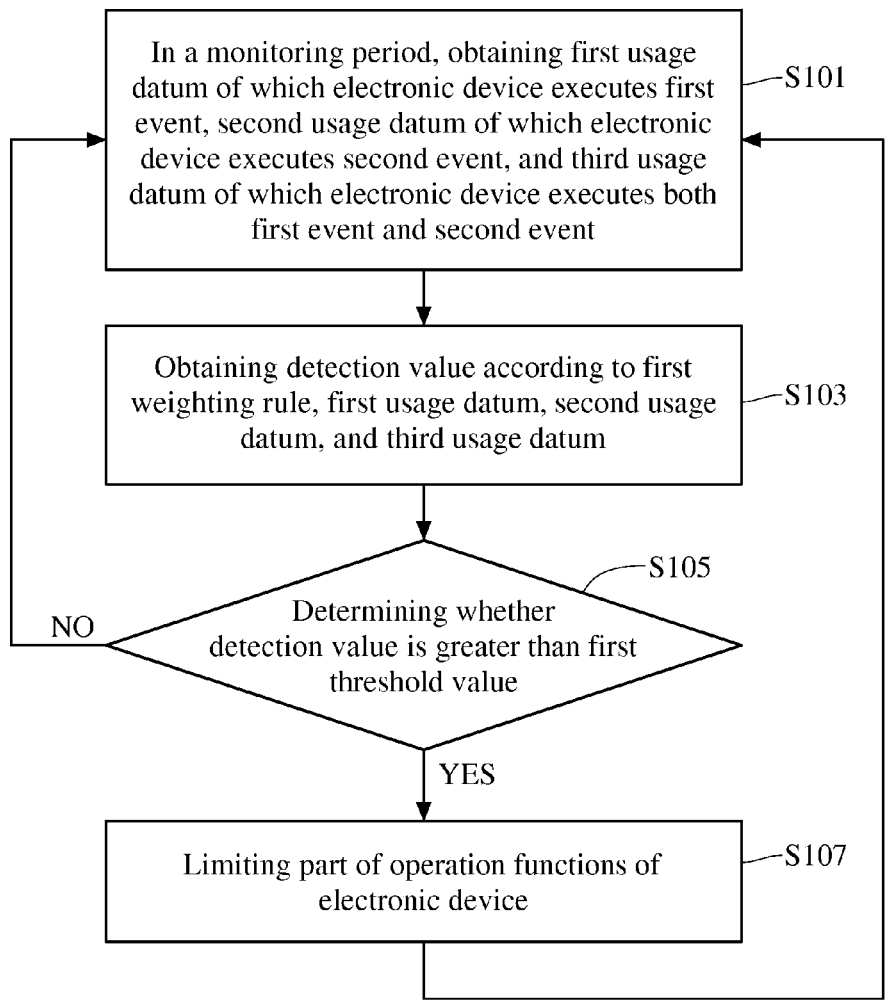
FIG. 1 is a flowchart of using time control method for electronic device according to an embodiment.

Please refer to FIG. 1. FIG. 1 is a flowchart of using time control method for electronic device according to an embodiment. As shown in FIG. 1, the method for controlling usage time of electronic device is for an electronic device, such as a smart phone, a laptop, a tablet computer, a desktop computer, or other suitable electronic device. The method for controlling usage time of electronic device is applied to the smart phone or the tablet computer with an application, or is applied to the laptop, desktop computer, or other suitable electronic device with software or firmware. The present embodiment is for illustrating but not for limiting the present disclosure.

For conveniently explaining the present disclosure, the following embodiments are explained using the application applied to the smart phone as an example, and the embodiments are for illustrating but not for limiting the present disclosure. In the step S101, in a monitoring period, the application obtains a first usage datum of a first event executed by the electronic device, a second usage datum of a second event executed by the electronic device, and a third usage datum of the second event executed by the electronic device. In the step S103, the application obtains a detection value according to a first weighting rule, the first usage datum, the second usage datum, and the third usage datum. In the step S105, the application determines whether the detection value is greater than a first threshold value. In the step S107, when the detection value is greater than the first threshold value, the application limits part of operation functions of the electronic device. In other words, the application selectively limits part of operation functions of the electronic device according to the detection value and a first threshold value.

Specifically, the electronic device executing the first event indicates a first component in the electronic device executing an operating event, and the electronic device executing the second event indicates a second component in the electronic device executing an operating event. In other embodiments, the electronic device executing the first event or the second event also indicates a non-single component executing an operating event. In other words, the electronic device executing the first event or the second event also indicates a plurality of components executing the event of the same or similar physical functions. The first component and the second component are, for example, the speaker, the display panel, the touch panel, the power button, or other suitable component of the smart phone. The executed first event and the second event are, for example, the speaker of the smart phone outputting sounds, activating the screen of the smart phone, the touch panel of the smart phone sensing a touch signal, the power button of the smart phone being pressed, or other suitable event. The monitoring period is the operating time of the electronic device executing the application or the period with a default time length before the current time determined by the application.

For example, when the first event is the event of activating the screen of the display panel of the smart phone, and the second event is the event of the speaker outputting sounds, and the first threshold value is set to 90, the application obtains the first usage datum of which the length of the time of activating the screen is 40 minutes according to the event of activating screen of the display panel of the smart phone in the monitoring period which is 3 hours before the current time, and obtains the second usage datum of which the length of the time of outputting sounds is 30 minutes according to the event of the speaker of the smart phone outputting sounds. In addition, the application obtains the third usage datum of which the length of the time is 20 minutes according to both the event of activating screen of the display panel of the smart phone and the event of the speaker of the smart phone outputting sounds.

Next, because the weight of executing a single event is 1, and the weight of executing double events is 1.2, the weight of the third usage datum is 1.2. Therefore, the application obtains the detection value 94 by adding the 40 minutes of the first usage datum, and the 30 minutes of the first usage datum, and the 20 minutes of the third usage datum multiplying the weight 1.2. The application determines whether the detection value is greater than the first threshold value according to the value 94. When the application determines that the detection value 94 is greater than the first threshold value 90, the application limits part of the functions of the electronic device, such as locking the touch screen of the smart phone and disabling the speaker to output sounds. The smart phone is only for dialing emergency calls with the touch screen and for outputting sounds when dialing emergency calls. In other embodiments, the application is available to limit the functions of the electronic device with other suitable ways. The embodiment is for illustrating but not for limiting the present disclosure.

In the present embodiment, when the application locks the touch screen of the smart phone, the application also limits the user to control the smart phone to perform other functions, so that the activation time of the screen of the smart phone and the speaker of the smart phone for outputting sounds are also limited. In other words, the application limits the electronic device to execute the first event or the second event. In practice, when part of the functions of the electronic device are limited, the application continuously obtains the detection value according to the usage condition of the electronic device, and the application resumes the limited part of the functions of the electronic device when the detection value is less than the threshold value. For example, in the previous embodiment, resuming the limited functions of the electronic device is unlocking the touch screen of the smart phone.

In addition, in the previous embodiment, the first weighting rule defines the weights according to the condition of which the electronic device executes the single event and the condition of which the electronic device executes the double events. According to the usage condition of the user, when the user only obtains information with the touch screen and does not listen to the music, or the user only listens to the music without watching the touch screen, the fatigue level of the user is less than the condition of which the user uses the smart phone and listens to the music at the same time. Therefore, in the first weighting rule, the application sets the weight of which the electronic device executes double events higher than the weight of which the electronic device executes a single event.

Figure 2:
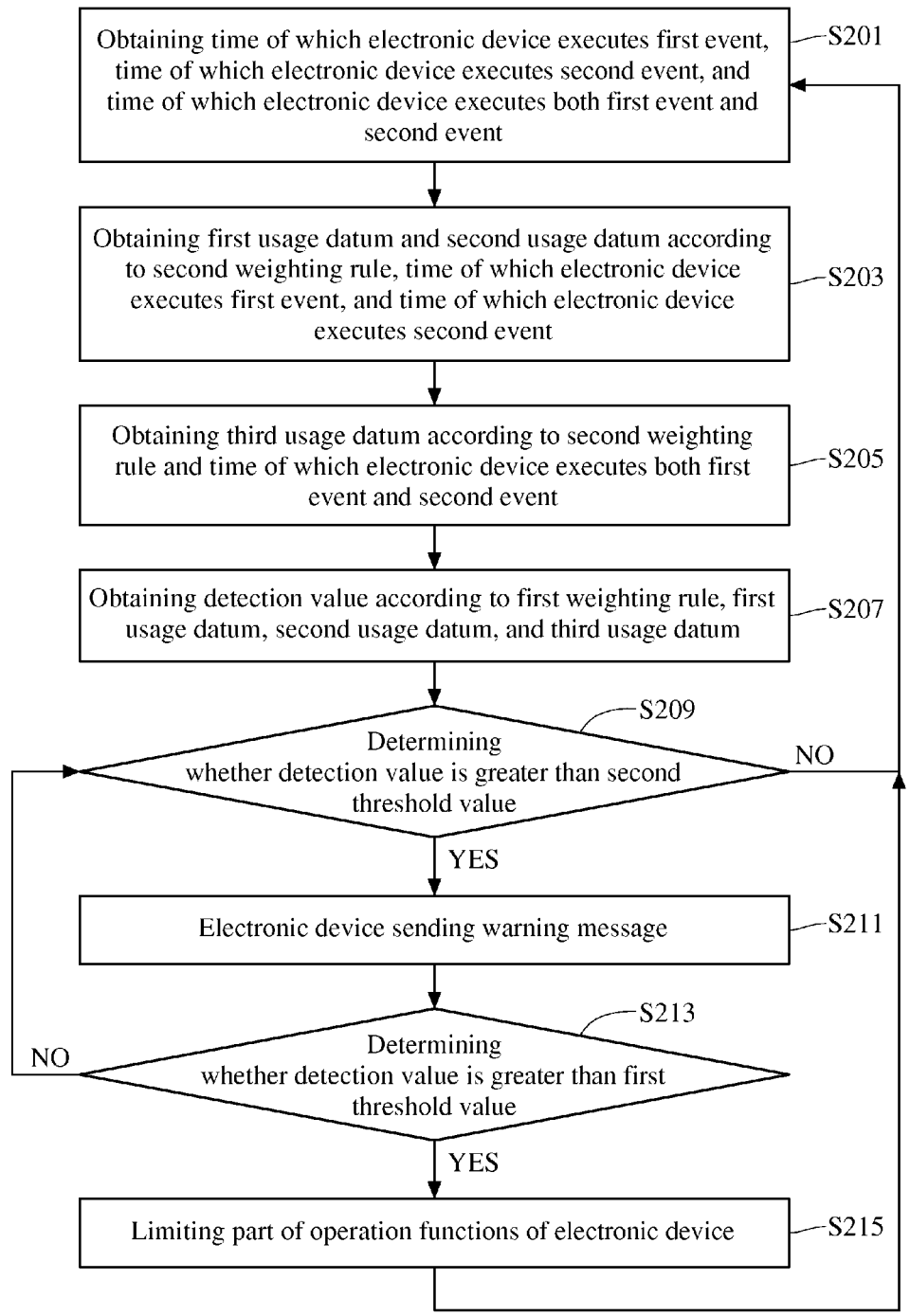
FIG. 2 is a flowchart of using time control method for electronic device according to another embodiment.

Please refer to FIG. 2. FIG. 2 is a flowchart of using time control method for electronic device according to another embodiment. As shown in FIG. 2, in the step S201, the application obtains a time of which the electronic device executes the first event, a time of which the electronic device executes the second event, and a time of which the electronic device executes both the first event and the second event. In the step S203, the application obtains the first usage datum and the second usage datum according to a second weighting rule, the time of which the electronic device executes the first event, and the time of which the electronic device executes the second event. In the step S205, the application obtains the third usage datum according to the second weighting rule and the time of which the electronic device executes both the first event and the second event. In the step S207, the application obtains the detection value according to the first weighting rule, the first usage datum, the second usage datum, and the third usage datum. In the step S209, the application determines whether the detection value is greater than the second threshold value. In the step S211, when the detection value is greater than the second threshold value, the application makes the electronic device send a warning message. In the step S213, the application determines whether the detection value is greater than the first threshold value. In the step S215, when the detection value is greater than the first threshold value, the application limits part of the functions of the electronic device.

The difference between the present embodiment and the previous embodiment is that a second weighting rule and a second threshold value are further included in the present embodiment, and the present embodiment discloses the steps of obtaining the first usage datum, the second usage datum, and the third usage datum. Specifically, the embodiment of the first event which indicates the event of activating the display panel of the smart phone and the second event which indicates the event of outputting sounds by the speaker is used for the following explanation. In the present embodiment, the first threshold value is set to 200, and the second threshold value is 80% of the first threshold value, that is, the second threshold value is 160.

In the monitoring period which is 3 hours before the current time, the application obtains the length of the time of which the screen is activated, the length of the time of which the speaker outputs sounds, the length of the time of which the smart phone both activates the screen and outputs sounds from the speaker according to the event of which the screen is activated and the event of which the speaker outputs sounds, wherein the length of the time of which the screen is activated is 40 minutes, and the length of the time of which the speaker outputs sounds is 30 minutes, and length of time of which the smart phone both activates the screen and outputs sounds from the speaker is 20 minutes. Next, the application obtains the first usage datum and the second usage datum according to the second weighting rule which is determined by the level of the visual fatigue, the hearing fatigue, or the motion fatigue of the user. Taking the example of which the weight of the visual fatigue is 2 and the weight of the hearing fatigue is 1.5, the application obtains the fatigue score of watching the screen 80 according to the length of the time of which the screen is activated, 40 minutes, and the corresponding weight 2. In other words, the first usage datum is 80. The application obtains the fatigue score of listening to the sounds outputting from the speaker 30 according to the length of the time of which the speaker outputs sounds, 20 minutes, and the corresponding weight 1.5. In other words, the second usage datum is 30. The application obtains the third usage datum 70 according to the length of the time of which the smart phone both activates the touch screen and outputs sounds from the speaker, 20 minutes. In other words, the third usage datum 70 is obtained by the length of the time of which the smart phone both activates the touch screen and the speaker outputs sounds, 20 minutes, multiplied by the weight of activating the screen, 2, plus the length of the time of which the smart phone both activates the touch screen and the speaker outputs sounds, 20 minutes, multiplied by the weight of which the speaker outputs sounds, 1.5.

Next, the application obtains the detection value 194 according to the first weighting rule, the first usage datum 80, the second usage datum 30, and the third usage datum 70. The application determines whether the detection value is greater than the second threshold value 160. When the detection value 194 is greater than the second threshold value 160, the application makes the electronic device display a warning message to notify the user to reduce the time of using the electronic device, and continuously obtains the detection value, and determines whether the detection value is greater than the first threshold value. When the detection value is between the first threshold value and the second threshold value, the application instructs the electronic device to send the warning message every 6 minutes. When the detection value is greater than the first threshold value, the application limits part of the functions of the electronic device.

In another embodiment, the first event is the event of activating the screen of the smart phone, and the second event is the event of the touch panel of the smart phone sensing the touch signal and the power button of the smart phone being pressed. Corresponding to different event, the first threshold value is set to 156, and the second threshold value is set to 124.8, and the weight of the single event in the first weighting rule is set to 1, the weight of the double events is set to 1.1. For example, in the monitoring period which is 3 hours before the current time, according to the event of activating the screen of the smart phone and the event of the touch panel of the smart phone sensing the touch signal and the event of the power button of the smart phone being pressed, the application obtains the length of the time of which the screen is activated and the touch panel does not sense any touch signal, the frequency of which the user presses the power button when the screen is not activated, the length of the time of which the user activates the screen and the touch panel senses the touch signal, and the frequency of which the touch panel senses the touch signal when the user activates the screen, wherein the length of the time of which the screen is activated and the touch panel does not sense any touch signal is 30 minutes, and the frequency of which the user presses the power button when the screen is not activated is 35 times, and the length of the time of which the user activates the screen and the touch panel senses the touch signal is 10 minutes, and the frequency of which the touch panel senses the touch signal when the user activates the screen is 45 times.

Next, the application obtains the first usage datum, the second usage datum, and the third usage datum according to the second weighting rule which is defined by the level of the visual fatigue and the motion fatigue of the user. Taking the example of which the weight of the visual fatigue is 2 and the weight of the motion fatigue is 0.5, the application obtains the first usage datum according to the length of the time of which only the screen is activated and the touch panel does not senses any touch signal and the corresponding weight, wherein the length of the time of which only the screen is activated and the touch panel does not senses any touch signal is 30 minutes and the corresponding weight is 2 and the first usage datum is 60. The application obtains the second usage datum according to the frequency of which the power button is pressed when the screen is not activated and the corresponding weight, wherein the frequency of which the power button is pressed when the screen is not activated is 35 times and the corresponding weight is 0.5 and the second usage datum is 17.5. The application obtains the third usage datum according to the length of the time of which the smart phone activates the screen and the touch panel senses the touch signal, the frequency of which the touch panel senses the touch signal when the screen is activated, the weight of the visual fatigue, and the weight of the motion fatigue, wherein the length of the time of which the smart phone activates the screen and the touch panel senses the touch signal is 10 minutes, and the frequency of which the touch panel senses the touch signal when the screen is activated is 45 times, and weight of the visual fatigue is 2, and the weight of the motion fatigue is 0.5, and the third usage datum is 42.5. In other words, the third usage datum 42.5 equals the length of the time of which the smart phone activates the screen and the touch panel senses the touch signal 10 multiplying the weight of the visual fatigue 2 plus the frequency of which the touch panel senses the touch signal when the screen is activated 45 multiplying the weight of the motion fatigue 0.5.

Next, the application obtains the detection value 124.25 according to the first weighting rule including the single event and double events, the first usage datum 60, the second usage datum 17.5, and the third usage datum 42.5. The application determines whether the detection value is greater than the second threshold value 124.8. When the detection value 124.25 is not greater than the second threshold value 124.8, the application maintains the usage condition of the electronic device, that is, the application does not limit the functions of the electronic device and continuously obtains the detection value and determines whether the detection value is greater than the first threshold value or the second threshold value.

In the present embodiment, the second weighting rule defines the weights according to the visual fatigue, the hearing fatigue, or the motion fatigue of the user caused by using the electronic device. According to the usage condition of the smart phone by the user, the fatigue levels resulting from watching the screen of the smart phone, listening to the smart phone, and sliding the user's finger on the smart phone are different. Therefore, the fatigue level of using the smart phone is becoming numeric by defining the second weighting rule.

Figure 3:
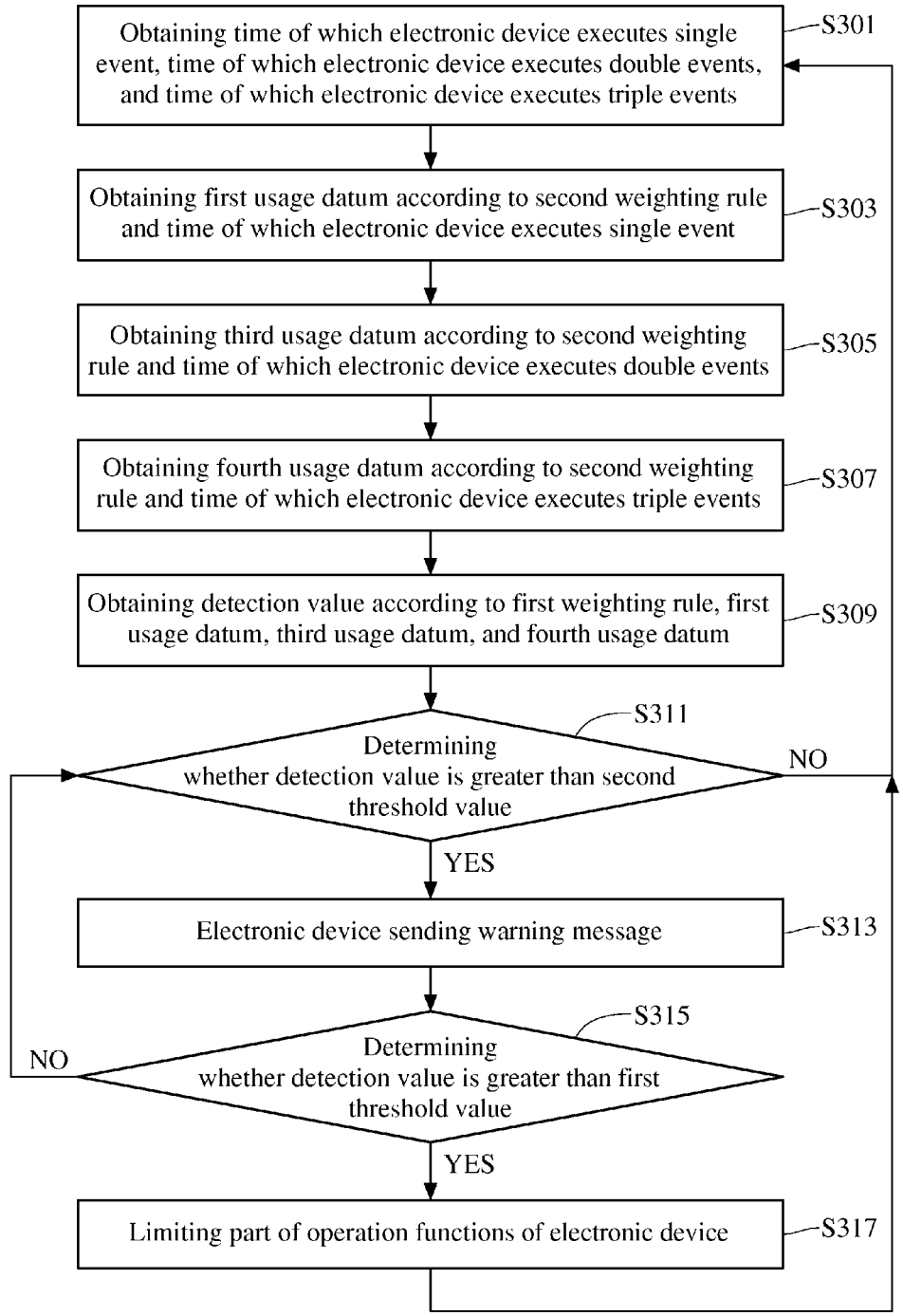
FIG. 3 is a flowchart of using time control method for electronic device according to a further embodiment.

Please refer to FIG. 3. FIG. 3 is a flowchart of using time control method for electronic device according to a further embodiment. As shown in FIG. 3, in the step S301, the application obtains a time of which the electronic device executes the single event, a time of which the electronic device executes the double events, and a time of which the electronic device executes the triple events. In the step S303, the application obtains the first usage datum according to the second weighting rule and the time of which the electronic device executes the single event. In the step S305, the application obtains the third usage datum according to the second weighting rule and the time of which the electronic device executes the double events. In the step S307, the application obtains the fourth usage datum according to the second weighting rule and the time of which the electronic device executes the triple events. In the step S309, the application obtains the detection value according to the first weighting rule, the first usage datum, the third usage datum, and the fourth usage datum. In the step S311, the application determines whether the detection value is greater than the second threshold value. In the step S313, when the detection value is greater than the second threshold value, the application makes the electronic device send a warning message. In the step S315, the application determines whether the detection value is greater than the first threshold value. In the step S317, when the detection value is greater than the first threshold value, the application limits part of the functions of the electronic device.

For clearer explanation, a specific embodiment is provided with Table 1.

TABLE 1

| | |
|---|---|
| time of which the electronic device only executes the first event | 30 minutes |
| time of which the electronic device only executes the second event | 15 minutes |
| frequency of which the electronic device only executes the third event | 35 times |
| time of which the electronic device executes both the first event and the second event | 10 minutes |
| time of which the electronic device executes both the first event and the third event | 10 minutes |
| frequency of which the electronic device executes both the first event and the third event | 45 times |
| time of which the electronic device executes both the second event and the third event | 10 minutes |
| frequency of which the electronic device executes both the second event and the third event | 20 times |
| time of which the electronic device executes the first event, the second event and the third event | 10 minutes |
| frequency of which the electronic device executes the first event, the second event and the third event | 20 times |
| weight of the visual fatigue | 2 |
| weight of the hearing fatigue | 1.5 |
| weight of the motion fatigue | 0.5 |
| weight of which the electronic device executes the single event | 1 |
| weight of which the electronic device executes first event and the second event | 1.2 |
| weight of which the electronic device executes the first event and the third event | 1.1 |
| weight of which the electronic device executes the second event and the third event | 1.05 |
| weight of which the electronic device executes the triple events | 2.1 |
| first threshold value | 250 |
| second threshold value | 200 |

In practical operations, the first event is the event of which the screen of the display panel is activated, and the second event is the event of the speaker outputting sounds, and the third event is the event of the touch panel sensing the touch signal and the power button being pressed. The conditions of the smart phone executing the single event include: (1) only the screen is activated, the speaker does not output sounds, and the touch panel does not sense the touch signal, (2) the screen is not activated, only the speaker outputs sounds, and the touch panel does not sense the touch signal, (3) the screen is not activated, the speaker does not output sounds, and only the power button is pressed. For the user, the conditions of occurring the single event include only the screen being activated, or only the speaker outputting sounds when the user listens to music, or the user pressing the power button when the screen and the speaker are not activated.

The conditions of the smart phone executing the double events include: (1) the screen is activated, the touch panel does not sense the touch signal, and the speaker outputs sounds, (2) the screen is activated, the speaker does not output sounds, and the touch panel senses the touch signal or the power button is pressed, (3) the screen is not activated, the speaker outputs sounds, and the power button is pressed. For the user, the condition of which the double events happen is, for example, that the user is watching the video with sounds and does not operate the touch panel, or the user is watching information without listening to the music and operates the touch panel or presses the power button to turn off the screen, or the user presses the power button to turn on the screen when the screen is turned off and the smart phone is playing the music. The condition of which the smart phone executes the triple events are, for example, that the screen is turned on and the speaker outputs sounds and the touch panel senses the touch signal or the power button is pressed. For the user, the condition of which the triple events happen is that the user plays games with sounds using the smart phone or operates the smart phone when watching a video with sounds.

When the application obtains the time of which the electronic device executes the single event, the time of which the electronic device executes the double events, and the time of which the electronic device executes the triple events, the application obtains the first usage datum of the first event 60 (30*2), the first usage datum of the second event 22.5 (15*1.5), the first usage datum of the third event 17.5 (35*0.5) according to the second weighting rule and the time of which the electronic device executes the single event. The application obtains the third usage datum of the first event and the second event 35 (10*2+10*1.5), the third usage datum of the first event and the third event 42.5 (10*2+45*0.5), the third usage datum of the second event and the third event 25 (10*1.5+20*0.5) according to the second weighting rule and the time of which the electronic device executes the double events. The application obtains the fourth usage datum of the first event, the second event, and the third event 45 (10*2+10*1.5+20*0.5) according to the second weighting rule and the time of which the electronic device executes the triple events.

The application multiplies the weight of the single event by the first usage datum of the single event, such as (60*1)+(22.5*1)+(17.5*1), and multiplies the weight of the double events by the third usage datum of the double events, such as (35*1.2+42.5*1.1+25*1.05), and multiplies the weight of the triple events by the fourth usage datum of the triple events, such as (45*2.1) to obtain the detection value 309.5. The application determines whether the detection value 309.5 is greater than the second threshold value. When the detection value 309.5 is greater than the second threshold value, the application determines whether the detection value 309.5 is greater than the first threshold value. When the detection value 309.5 is greater than the first threshold value, the application limits part of the functions of the electronic device.

In the present embodiment, the first weighting rule defines the weights according to the conditions of executing the single event, the double events, or the triple events by the electronic device. From the perspective of user using the smart phone, when the user only uses the electronic device to execute the single event, the fatigue level of the user is less than the condition of which the user uses the electronic device to execute the double events. When the user uses the electronic device to execute the double events, the fatigue level of the user is less than the condition of which the user uses the electronic device to execute the triple events. Therefore, in the first weighting rule, the application defines the weight of which the electronic device executes the triple events higher than the weight of which the electronic device executes the double events, and defines the weight of which the weight of which the electronic device executes the double events higher than the weight of which the electronic device executes the single event. In addition, in an embodiment, the weight of which the electronic device executes the double events is between the weight of which the electronic device executes the single event and the double weight of which the electronic device executes the single event, and the weight of which the electronic device executes the triple events is greater than the weight of which the electronic device executes the single event.

In an embodiment, the method for controlling usage time of electronic device further includes detecting the length of the operating time of the executed application, determining whether the length of the operating time of the executed application is greater than a default time length. When the length of the operating time of the executed application is greater than a default time length, the application determines the period of the detection value which is advancing the current time for the default time length as the monitoring period. When the length of the operating time of the executed application is not greater than a default time length, the application determines the operating period as the monitoring period. For example, when the default time length is set to 4 hours and the application applying the method for controlling usage time of electronic device of the present disclosure is executed at 9:00 in the morning, the detection value at 12:00 in the afternoon is calculated using the period of 9:00 in the morning to 12:00 in the afternoon as the monitoring period. The detection value at 2:00 in the afternoon is calculated using the period of 10:00 in the morning to 2:00 in the afternoon as the monitoring period.

As the advancement of modern technology, the components and functions in the electronic device are more and more and the time of the user using the electronic device is getting longer. Therefore, a numerical method for analyzing the condition of the user using the electronic device is needed to notify the user and limit the usage time of the electronic device. The method of the present disclosure obtains the usage condition of which the electronic device executes the single event or the multiple events, and compares the numerical results with the threshold values to selectively limit part of the functions of the electronic device, so that the usage time of the electronic device is controlled and the user is notified to avoid using the electronic device with too much time and affecting life and health.

The foregoing description has been presented for purposes of illustration. It is not exhaustive and does not limit the disclosure to the precise forms or embodiments disclosed. Modifications and adaptations will be apparent to those skilled in the art from consideration of the specification and practice of the disclosed embodiments of the disclosure. It is intended, therefore, that the specification and examples be considered as exemplary only, with a true scope and spirit of the disclosure being indicated by the following claims and their full scope of equivalents.

What is claimed is:

1. A method for controlling usage time of electronic device for an electronic device, comprising:
   in a monitoring period, obtaining a first usage datum of which the electronic device executes a first event responsive to a first operation by a user, a second usage datum of which the electronic device executes a second event responsive to a second operation by the user, and a third usage datum of which the electronic device executes both the first event and the second event in the same period;
   obtaining a detection value according to a first weighting rule, the first usage datum, the second usage datum, and the third usage datum; and
   selectively limiting part of operation functions of the electronic device according to the detection value and a first threshold value,
   wherein the first event relates to an application programs interacting with the user via at least one among a visual activity, a hearing activity, and a touching control activity;
   wherein the second event relates to an application programs interacting with the user via at least one among a visual activity, a hearing activity, and a touching control activity other than the application related to the first event;
   wherein the first usage datum is obtained by monitoring the first event and the second usage datum is obtained by monitoring the second event;
   wherein a weight of the third usage datum in the first weighting rule is larger than zero.

2. The method of claim 1, wherein the step of selectively limiting part of operation functions of the electronic device comprises:
   determining whether the detection value is greater than the first threshold value; and
   limiting part of operation functions of the electronic device when the detection value is greater than the first threshold value.

3. The method of claim 2, further comprising:
   determining whether the detection value is greater than a second threshold value which is less than the first threshold; and
   the electronic device sending a warning message when the detection value is greater than the second threshold value.

4. The method of claim 1, wherein the step of selectively limiting part of operation functions of the electronic device comprises limiting the electronic device to execute the first event or the second event.

5. The method of claim 1, wherein in the first weighting rule, the priority of the third usage datum is higher than the priority of the first usage datum and the priority of the second usage datum.

6. The method of claim 1, wherein after the step of selectively limiting part of operation functions of the electronic device, the method further comprises a step of resuming the limited part of operation functions of the electronic device when the detection value is less than the first threshold value.

7. The method of claim 1, wherein executing the first event indicates a first component in the electronic device executing an operating event, and executing the second event indicates a second component in the electronic device executing an operating event.

8. The method of claim 1, wherein the step of obtaining the first usage datum, the second usage datum, and the third usage datum further comprises:
   obtaining a time of which the electronic device executes the first event, a time of which the electronic device executes the second event, and a time of which the electronic device executes both the first event and the second event;

obtaining the first usage datum and the second usage datum according to a second weighting rule, the time of which the electronic device executes the first event, and the time of which the electronic device executes the second event; and obtaining the third usage datum according to the second weighting rule and the time of which the electronic device executes both the first event and the second event.

9. The method of claim 1, wherein the step of obtaining the first usage datum, the second usage datum, and the third usage datum further comprises:

obtaining the time of which the electronic device executes the first event, a frequency of which the electronic device executes the second event, the time of which the electronic device executes both the first event and the second event, and a frequency of which the electronic device further executes the second event when executing the first event;

obtaining the first usage datum and the second usage datum according to a second weighting rule, the time of which the electronic device executes the first event, and the frequency of which the electronic device executes the second event; and obtaining the third usage datum according to the second weighting rule, the time of which the electronic device executes both the first event and the second event, the frequency of which the electronic device further executes the second event when executing the first event.

10. The method of claim 9, further comprising:

obtaining a fourth usage datum of which the electronic device executes the first event, the second event, and a third event.

11. The method of claim 10, wherein the step of obtaining a fourth usage datum of which the electronic device executes the first event, the second event, and a third event further comprises:

obtaining a time of which the electronic device executes the first event, the second event, and a third event and a frequency of which the electronic device further executes the second event when executing the first event and the third event; and obtaining the fourth usage datum according to the second weighting rule, the time of which the electronic device executes the first event, the second event, and a third event and the frequency of which the electronic device further executes the second event when executing the first event and the third event.

12. The method of claim 10, wherein the step of selectively limiting part of operation functions of the electronic device further comprises limiting the electronic device to execute the first event, the second event, or the third event.

13. The method of claim 10, wherein the step of obtaining the detection value further comprises obtaining the detection value according to the first weighting rule, the first usage datum, the second usage datum, the third usage datum, and the fourth usage datum.

14. The method of claim 13, wherein in the first weighting rule, the priority of the fourth usage datum is higher than the priority of the first usage datum, the priority of the second usage datum, and the priority of the third usage datum.

15. The method of claim 10, wherein executing the first event indicates a first component in the electronic device executing an operating event, and executing the second event indicates a second component in the electronic device executing an operating event, and executing the third event indicates a third component in the electronic device executing an operating event.

16. The method of claim 1, wherein the method is further for an application executed by the electronic device and further comprises:

detecting a length of an operating time of which the electronic device executes the application; and determining whether the length of the operating time is greater than a default time length;

wherein when the length of the operating time is greater than the default time length, using a current time advancing the default time length as the monitoring period;

wherein when the length of the operating time is less than the default time length, using the length of the operating time as the monitoring period.

* * * * *